United States Patent [19]
Lee, II et al.

[11] Patent Number: 5,676,309
[45] Date of Patent: Oct. 14, 1997

[54] THERMALLY RESPONSIVE FLOW CONTROL VALVE

[75] Inventors: Leighton Lee, II, Guilford; Philip James Morgan, Gales Ferry, both of Conn.

[73] Assignee: The Lee Company, Westbrook, Conn.

[21] Appl. No.: 349,785

[22] Filed: Dec. 6, 1994

[51] Int. Cl.$^6$ ..................................................... G05D 23/02
[52] U.S. Cl. ................................. 236/93 R; 236/100
[58] Field of Search ............................... 236/93 R, 93 A, 236/93 B, 99 K, 99 J, 100

[56] References Cited

U.S. PATENT DOCUMENTS

| | | | |
|---|---|---|---|
| 2,556,777 | 6/1951 | Reimuller | 236/93 B |
| 3,096,936 | 7/1963 | Woods | 236/93 A |
| 3,659,783 | 5/1972 | Schwartz | 236/93 A |
| 4,212,346 | 7/1980 | Boyd | 236/100 |
| 4,488,680 | 12/1984 | Itoh | 236/93 A |
| 5,018,665 | 5/1991 | Sulmone | 236/100 |
| 5,516,042 | 5/1996 | Gertengerger | 236/93 A |

*Primary Examiner*—William E. Tapolcai
*Attorney, Agent, or Firm*—Philip J. Lee

[57] ABSTRACT

A flow control valve comprises a valve body with a central flow passage containing a poppet releasably engagable with an annular valve seat, the poppet comprising a poppet head engageable with the valve seat and a central bore filled with an expansion member formed of silicone rubber or other substance having a coefficient of thermal expansion different from the material of the valve body and the poppet bore being closed by a stop member fixed in position relative to the valve seat, whereby the expansion or contraction of the expansion member causes the poppet head to move toward or away from the valve seat, increasing or decreasing flow through the valve. A spring adjustably pre-compresses the expansion member and balances the force created by the expansion of the expansion member, the axial position of the stop member being adjustable. The poppet head is notched to allow at least a trickle flow past the valve seat at all times to cause the expansion member to maintain a temperature approximately equal to the temperature of the fluid medium in the system. Two embodiments are shown, the first having the valve seat between the poppet head and the stop member such that increases in temperature of the fluid causes an increase of flow through the valve, and a second configuration in which the poppet head is between the valve seat and the stop member, such that increases in temperature of the fluid causes an decrease of flow through the valve.

21 Claims, 4 Drawing Sheets

THERMALLY RESPONSIVE FLOW CONTROL VALVE

BACKGROUND OF THE INVENTION

A. Field of Invention

The present invention relates generally to devices for controlling flow and more particularly to a new and improved thermally responsive flow control valve.

B. Description of Related Art

In a variety of applications it is desirable to control the rate of flow of a fluid as a function of the temperature of the fluid. For example, it is desirable to provide variable cooling to electronic components by regulating the rate of flow of the coolant through portions of the coolant system by means of monitoring the coolant temperature and using a control circuit to operate a control valve to vary the rate of flow in accordance with the change of temperature of the coolant. Such a system however, is relatively complicated and relies upon a number of elements, each of which introduce potential failure rates into the system which may then have a cumulative rate of failure that is unacceptable. Since the coolant system in sophisticated electronic systems may be critical to the performance of the system as a whole, a means of controlling the rate of flow without introducing significant risk of failure is desirable. It is desirable in such cases to provide an inexpensive, reliable means for increasing the rate of flow in proportion to the increase in fluid temperature. Additional reliability of the system as a whole is achieved if the control means is self powered and self regulating, particularly when the means of powering and regulating is not electronic and is not dependant upon the same conditions as the system to be protected.

In other applications it is necessary to decrease the rate of flow in proportion to the increase in fluid temperature. One such application is in the distribution of a hot fluid to provide heating to components which must be kept warm in a cold environment, where it is necessary or advantageous to avoid exceeding an optimal temperature or to cease heating once a predetermined temperature is reached. Such a control could be performed by means of monitoring the heating fluid temperature and passing that information to a control circuit operating a flow control valve to be closed as the heater fluid temperature increases and then opened as the temperature decreases. Such a heating control system suffers from the same drawbacks as the coolant system described above, being relatively complicated and adding a significant cumulative failure rate to the system. As in the coolant system discussed above, a relatively simple, self powered and self regulating device would provide increased reliability, as well as reduced cost of manufacture and maintenance. In such heating or cooling subsystems, reliability is frequently crucial as a failure of the subsystem may lead to inoperability or destruction of the system as a whole.

III. Summary of the Invention

The invention herein described is a new and improved self powered and self regulating thermally responsive flow control valve. The valve is suitable for installation in the bore of a fluid passageway wherein it is necessary to control the rate of flow as a function of the temperature of the fluid within the passageway. The valve comprises a generally tubular body having a port at each end and a central flow passage therebetween. An annular, chamfered valve seat is formed by the inner surface of the valve body, surrounding the flow passage and a poppet is received within the flow passageway and placed to be releasibly engageable with said valve seat to control flow through the valve body. The poppet comprises a head section and a generally cylindrical body with a central blind bore which is open at one end. The poppet head section comprises an annular shoulder that faces and is engageable with the valve seat. The poppet body is preferably formed of a material having a relatively high thermal conductivity. The interior of the poppet bore contains an expansion member formed of a substance chosen for its characteristic of having a high coefficient of thermal expansion relative to the other materials used. The expansion member is secured within the poppet bore by a stopper at the open end of the poppet bore. At one end, the stopper comprises male screw threads corresponding to female screw threads on the interior of the valve body, such that the axial position of the stopper may be altered to the desired axial location to obtain the desired operation of the valve in response to temperature. After the valve has been adjusted to the desired performance to allow for the different temperature settings at which the valve will open or close, the axial position of the stopper may be fixed by spot welding, or similar means. A spring is retained within the valve body and forces the poppet in the direction of the stopper such that the thermally responsive expansion member is subject to preloaded compressive forces. When the poppet has been balanced by the spring, an increase in temperature of the fluid flowing through the flow passage of a valve body, and around the poppet body raises the temperature of the thermally responsive expansion member, causing it to expand and causing the poppet to move the direction away from the stopper. If the expansion member is formed of a substance which can not relieve radial compression caused by the increase in temperature, by deforming longitudinally, a radial clearance within the poppet bore may be required. Use of a plastic and elastic substance eliminates the need for a radial clearance and requires containment to prevent extrusion under pressure. Silicone rubber is found to have a high coefficient of thermal expansion and is used in a preferred embodiment as the material of the expansion member. The poppet bore receives an expansion member such as a slug of silicone rubber and is sealed by a closely fitting plug section of the stopper. The plug section is not so tightly fit into the poppet bore as to render the poppet incapable of axial displacement and the sealing of the poppet bore is enhanced by a rubber o-ring type gasket. The gasket is retained within a annular recess on the outside of the plug surface such that the gasket prevents leakage of the system fluid past the plug section into the poppet bore and into contact with the expansion member. The plug section is part of the stopper which is securely fixed within the valve body flow passage. The poppet shoulder facing the valve seat is notched such that the fluid media is allowed to trickle past the valve seat even when the valve is closed. The trickle flow maintains the temperature of the thermally responsive material of the expansion member relative to the temperature of the fluid media, so that the valve opens only in response to a change in temperature of the fluid in the system rather than the tendency of fluid otherwise trapped in the valve body to assume the ambient temperature. In addition and in some cases more importantly, the system fluid is not stagnant and a temperature change in the fluid can be communicated to the valve by the continuous exchange of fluid within the valve. The size of the notch controls the amount of trickle flow and, thereby, the time required for the temperature change to be communicated to the valve, as well as the responsiveness of the valve to changes in the temperature of the fluid media. One method of securing the valve within the flow passageway is to taper at least a portion of the exterior of the valve body. With this method, the bore of the flow passageway is reamed to form a corresponding tapered inner wall and, during installation, the valve will find a secure seat that will seal the passageway preventing flow except as may be allowed past the valve seat in the interior of the valve. Although the press fit of the valve and the contact of the opposing tapered surfaces of the exterior of the valve and the interior of the flow passageway secures the valve in place, the valve has a greater resistance to movement in the direction of the narrower end of the tapered section. For this reason, the valve is preferably installed such that the larger diameter end is expected to be exposed to higher pressure. For the purposes of this application, the larger end will be called the first end and the narrower end will be called the second end to reflect the fact that the flow through the valve may be in either direction.

Two embodiments of the thermally responsive control valve are described herein, differing in the direction of the poppet bore relative to the valve seat. One embodiment of the valve has been specifically designed to control coolant flow and is therefore herein called the coolant valve, solely for the purposes of this application and without limiting, or implying a limitation of, the usefulness of the valve to the control of coolant. A spring within the coolant valve biases the poppet valve head toward the valve seat and the direction of the poppet bore from open end to blind end is opposite to the direction from the poppet valve head to the valve seat. Therefore, expansion of the expansion member causes the poppet valve head to move away from the valve seat and an increase in the temperature of the fluid media around the poppet body, by raising the temperature of the thermally responsive material of the expansion member, forces the poppet valve head to move away from the valve seat thereby opening the valve and increasing the rate of flow through the valve. The spring acts on the end of the poppet head opposite to the shoulder that engages the valve seat and the spring is compressed and held in place by a spring retention member at the end of the valve facing the valve seat. The spring retention member has male screw threads on the outer surface that engage corresponding female screw threads in the inner wall of the valve body. The interior of the spring retention member provides a fluid passageway and the outer end of the inner wall has female screw threads to allow the engagement of an extraction tool for the removal of the valve.

A second embodiment of the valve of the present invention has been designed to control the flow of heating fluids and is therefore herein called the heater valve, solely for the purposes of this application and without limiting, or implying a limitation of, the usefulness of the valve to the control of the flow of heating fluids. A spring biases the poppet valve head away from the valve seat and the direction of the poppet bore from open end to blind end is in the same direction as the direction from the poppet valve head to the valve seat, with the opening of the poppet bore being at the valve head end of the poppet. Therefore, expansion of the expansion member causes the poppet valve head to move toward the valve seat. An increase in temperature of the fluid media results in the expansion of a thermally responsive expansion member within the poppet, causing the poppet valve head to approach the valve seat and reduce flow through the valve. The spring is compressed between a shoulder formed in the end of the poppet opposite to the valve head end and an opposing shoulder formed in the inner wall of the valve body. The open end of the poppet bore is toward the end of the heater valve toward which the valve seat faces and the stopper is secured by threading engagement with the inner wall of the valve body. Flow passages are formed through the stopper at one end of the heater valve to allow the fluid media to enter the valve and through the valve body and poppet at the other end to allow the fluid media to exit the valve. The outer end of the stopper forms a hexagonal socket in addition to the flow passages, providing a means for rotating the stopper and thereby adjusting the axial position of the stopper. The adjustment of the axial position of the stopper changes the compression of the expansion member and the spring with corresponding alteration in the performance of the heater valve. The inner surface of the larger end of the heater valve body has female screw threads to provide means for engaging a valve extraction tool.

The principal aim of the present invention is to provide a new and improved flow control valve which meets the foregoing requirements and which is capable of varying the rate of flow through the valve as a function of the temperature of the fluid flowing through the valve.

Another and further object and aim of the present invention is to provide a new and improved thermally responsive flow control valve which operates without an outside power source.

Yet another and further object and aim of the present invention is to provide a new and improved thermally responsive flow control valve which will be economical to manufacture and install.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

IV. Brief Description of the Drawings FIG. 1 is a cross sectional view of a first preferred embodiment of the invention taken along the longitudinal axis of the valve, showing the valve installed in a bore.

V. Description of the Preferred Embodiment(s)

Figure 1:
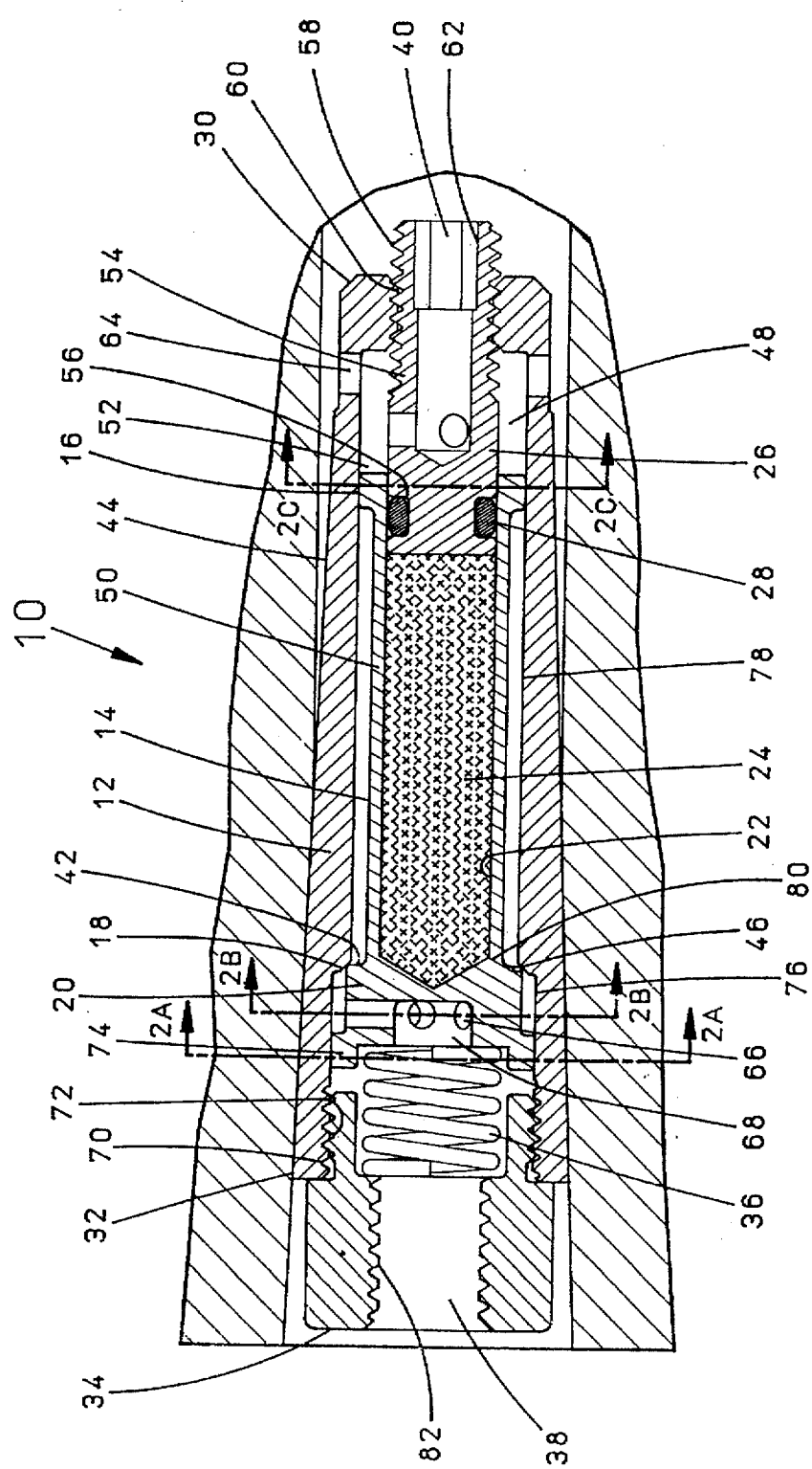
Figure 3:
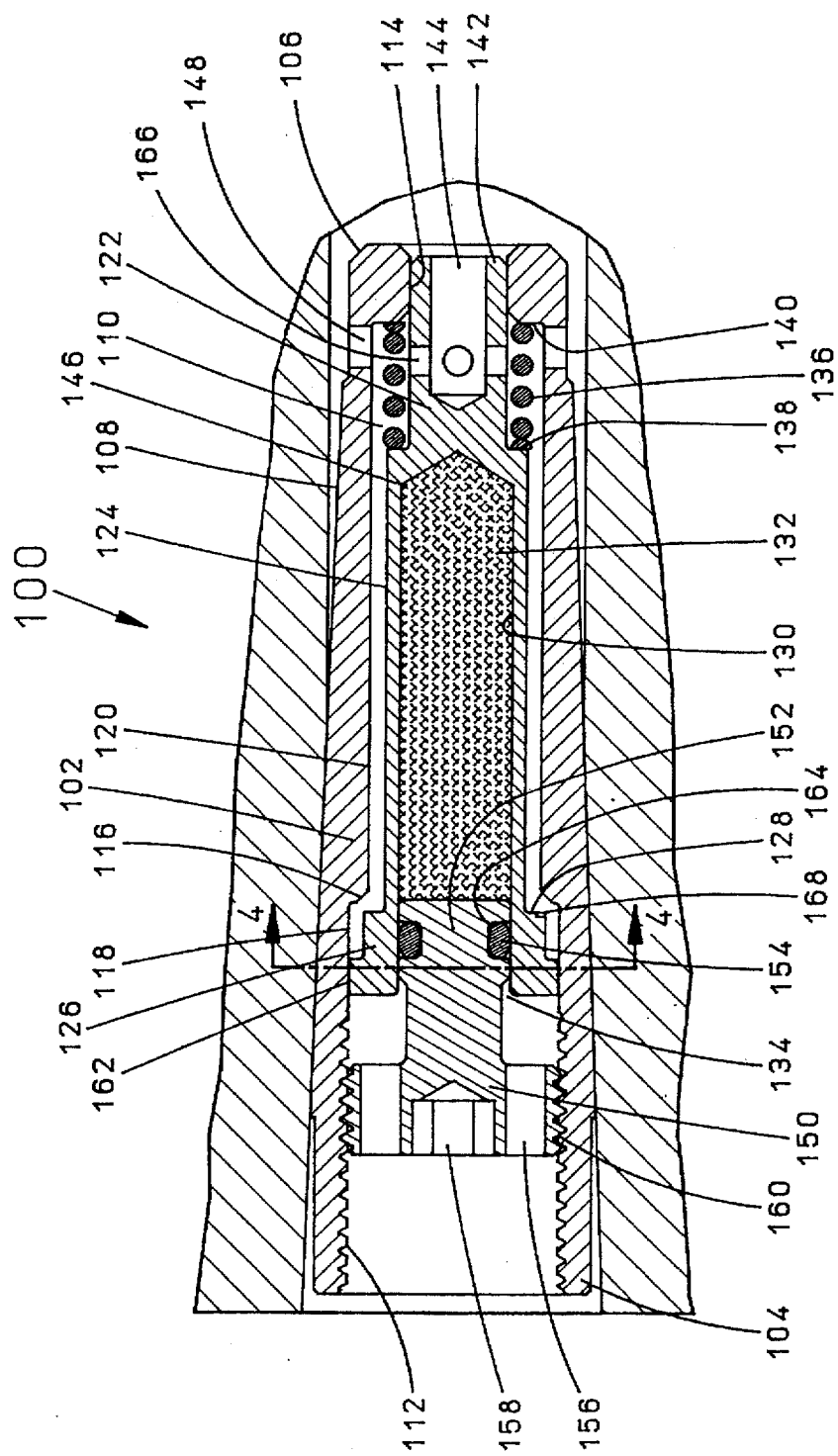
FIG. 3 is a cross sectional view of a second preferred embodiment of the invention taken along the longitudinal axis of the valve, showing the valve installed in a bore.
Figure 4:
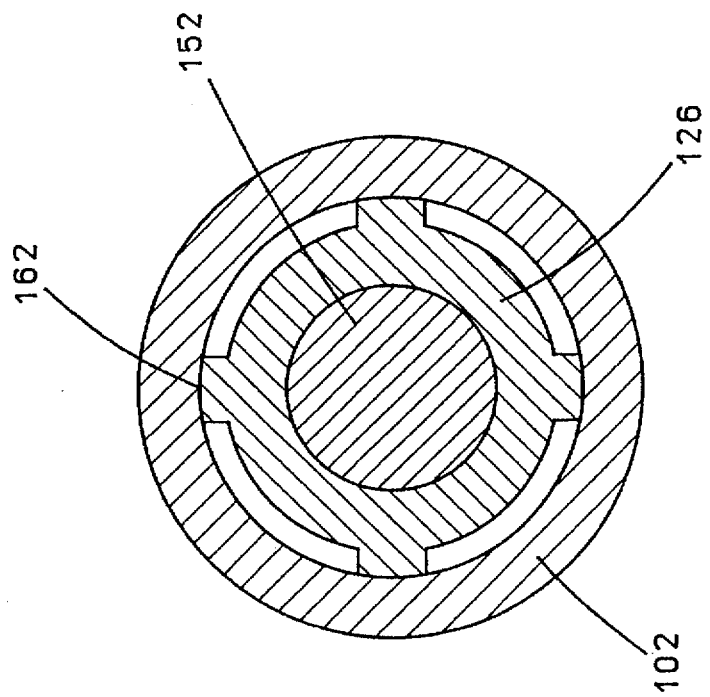
FIG. 4 is a cross sectional view of a second preferred embodiment of the invention taken along the line 4—4 shown in FIG. 3.

With reference to the Drawings wherein like numerals represent like parts throughout the Figures, two embodiments of a valve in accordance with the present invention are generally designated by numerals 10 and 100 in FIGS. 1 and 3 respectively.

Figure 2C:
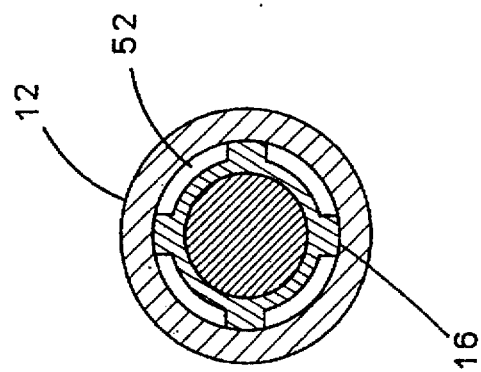
FIG. 2C is a cross sectional view of a first preferred embodiment of the invention taken along the line 2C—2C shown in FIG. 1.
Figure 2B:
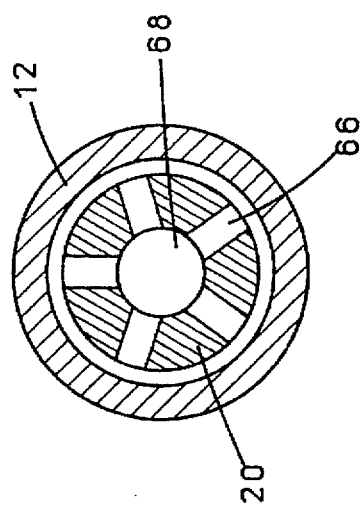
FIG. 2B is a cross sectional view of a first preferred embodiment of the invention taken along the line 2B—2B shown in FIG. 1.
Figure 2A:
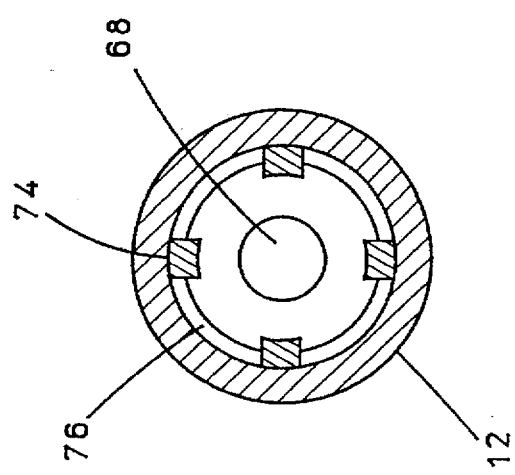
FIG. 2A is a cross sectional view of a first preferred embodiment of the invention taken along the line 2A—2A shown in FIG. 1.

The first embodiment of the invention designated by the numeral 10, is designed to control the flow of a liquid coolant and is suitable for installation in the bore of a fluid passageway, as shown in FIG. 1. Valve 10 comprises a generally tubular body 12 having a first end 32 and a second end 30. Valve body 12 comprises an outer surface 44, which is generally conical being tapered from a maximum outside diameter proximate to first end 32 to second end 30 which is of smaller outside diameter. The angle of taper of valve body surface 44 preferably ranges from 1 to 7 degrees and an angle of degrees 4.3 is anticipated as providing the optimum taper. The process of installing valve 10 within a flow passageway involves the reaming of the flow passageway to form an internally tapered section capable of securely retaining the tapered outer surface 44 of valve 10. Both the installation bore and the outer surface 44 are tapered at equal or approximately equal degrees, allowing the valve 10 to find and effectively seal an appropriate seat within the flow passageway with any radial dimensional inaccuracies resulting in a slight difference in axial placement of valve 10 in final seating, rather than resulting in leakage around valve 10. A central cavity 48 is formed within body 12 and extends axially through the center of body 12. An annular valve seat 18 is formed by the chamfered edge of a shoulder formed at the juncture of a larger inside diameter section 76 and a smaller inside diameter section 78 of central body cavity 48, the larger section 76 being toward the first end 32 and the smaller section 78 being toward the second end 30. Valve seat 18 surrounds the central body cavity 48. A poppet 14 is received within cavity 48 and placed to be releasibly engageable with valve seat 18 to control flow through the valve 10. The poppet 14 comprises a head section 20 and a generally cylindrical body section 50. The poppet head section 20 is of larger radial diameter than poppet body section 50 forming an annular shoulder 42 at the junction of the poppet head section 20 and the poppet body section 50. The outer end of poppet head section 20 includes radially extending guide members 74 which slidingly engage the interior wall of valve body 12 to provide support and guidance for the head section 20 of the poppet 14, while allowing fluid communication between guide members 74 in the radial gap between the inside wall of largr diameter section 76 and the radially outer surface of poppet head section 20. As shown in FIG. 2, five flow passages 66 extend radially through the poppet head section 20 from a central opening 68 in the end of poppet head section 20 to provide fluid communication past the head section guide members 74 into the central cavity 48. Poppet body section 50 is a cylindrical shell surrounding a central blind bore 22 which has one open end 52 at the opposite end from poppet head section 20 and a closed end 80 proximate to poppet head section 20. The poppet body section 50 is preferably formed of a material having a relatively high coefficient of thermal conductivity. Four poppet guides 16 extend radially outward from the open end 52 of poppet 14 to slidingly engage the inner wall of smaller diameter section 78 of valve body 12 and thereby provide radial support and guidance for poppet body section 50. The interior of the poppet bore 22 is filled with expansion member 24 in the form of a tightly fitted silicone rubber slug. The direction of the poppet bore 22 from open end 52 to closed end 80 is the same as the direction of the expansive thrust of expansion member 24 and is in the direction from valve seat 18 to poppet shoulder 42. The open end 52 of the poppet bore 22 is sealed by a closely fitting plug section 26 of a stop member 54. The stop member 54 comprises male screw threads 58 which correspond to female screw threads 60 formed on the interior of the second end 30 of valve body 12, such that the axial placement of the stop member 54 within the valve body cavity 48 can be securely fixed. Stop member plug section 26 comprises a solid cylindrical plug having an outside diameter approximately equal to or slightly less than the inside diameter of the open end 52 of poppet bore 22. By means of plug section 26, stop member 54 prevents the axial movement of expansion member 24 away from valve seat 18. The other end of expansion member 24 is secured against movement relative to poppet head section 20 by the closed end 80 of poppet bore 22. The poppet bore 22 is sealed by a rubber o-ring type gasket 28 retained within a annular channel 56 formed on the outside of the surface of plug section 26 such that the gasket 28 prevents leakage of the fluid medium past the plug section 26 to avoid contact with, and contamination of expansion member 24. Poppet 14 is capable of axial displacement relative to stop member 54 and the valve body 12 including valve seat 18.

A second end port 40 is formed within stop member 54 and the outer end of second end port 40 forms a hexagonal socket 62. The axial position of stop member 54 within valve body 12 is adjustable by insertion of a hexagonal wrench into socket 62 and thereby causing rotation of stop member 54 relative to valve body 12. After the desired axial position of stop member 59 is achieved, the position is preferably fixed by tack welding or other suitable means for preventing additional rotation of stop member 54. Radial ports 64 are formed in the valve body 12 between valve seat 18 and second end 30 and the outer surface of value body 12 is additionally reduced proximate to the radial ports 64 such that there is a clearance between the value body 12 and the installation bore, allowing fluid communication with the flow passage in which value 10 is installed. Radial ports 64 may vary in size placement and number so long as all such ports are on the side of valve seat 18 toward second end 30 and do not interfere with the sealing function of the valve body outer surface 44 as described herein. Accordingly, the fluid media may flow between the installation bore and the interior of valve 10 through both radial ports 64 and second end port 40 and may continue despite the blockage of second end port 40 by a wrench during adjustment.

At first end 32 of valve 10, a spring retaining member 34 retains a spring 36 between poppet head section 20 and spring retaining member 34. The inside wall of valve body cavity 48 forms female screw threads 70 which correspond to and engage male screw threads 72 formed on the outer surface of spring retention member 34 to secure the axial position of spring retention member 34 relative to first end 32 of valve body 12. A first end port 38 is formed in the center of spring retention member 34 and is of sufficient capacity for the total flow anticipated through valve 10 since flow between the flow passage and the interior of valve 10 through first end 32 is only possible through port 38. The inside diameter of port 38 is smaller than spring 36 in at least one dimension, in order to provide a restraint for spring 36. The interior surface of first end port 38 forms female screw threads 82 that provide a means for securing an extraction tool (not shown) to valve 10. With the exception of the intrinsic asymmetry of spring 36 and the various screw threads and the placement of ports 66 and 64, and guides 74, valve 10 is generally symmetrical about its longitudinal axis.

On assembly of valve 10, stop member 54 is adjusted to compress both the spring 36 and expansion member 24, balancing the spring force of spring 36 and the resilience and expansive force of expansion member 24 at the ambient temperature, thereby placing shoulder 42 at a predetermined axial position with respect to valve seat 18. At the desired valve opening temperature, the force of expansion of expansion member 24 counteracts the spring force of spring 36 to open the gap between poppet shoulder 42 and valve seat 18 and allow increased flow through valve 10. As the temperature of the fluid medium decreases, the expansion member 24 contracts and the spring force of spring 36 is allowed to reduce the clearance between valve seat 18 and poppet shoulder 42 to achieve the appropriate reduction of flow through valve 10. A notch 46 is formed in poppet shoulder 42 to allow a trickle flow of the fluid medium past valve seat 18 such that the poppet body 50 is constantly exposed to fluid medium having the ambient temperature of the system in which valve 10 is installed and the fluid within the valve 10 is constantly changing. In this manner, it is possible for changes in the temperature of the fluid medium remote from valve 18 to travel through the system to valve 10, thereby improving the responsiveness of valve 10 to changes in the system temperature. The trickle flow through the closed valve 10 also avoids the unintended operation of the valve 10 by the passive loss or gain of heat by the fluid medium which would otherwise be retained within the valve cavity 48 after valve 10 closes.

In FIG. 3, a second embodiment of the present invention is designated as valve 100. Valve 100 is similar in size, shape, and general configuration to valve 10 and functions according to the same general principles as valve 10 but in a manner opposite to that of valve 10, in that flow through valve 100 is reduced when the temperature of the fluid medium increases. Valve 100 comprises a body 102 that is similar to the valve body 12, having a first end 104 and a second end 106. Valve body 102 comprises a conical outer surface 108 that is tapered from a larger diameter at first end 104 to a smaller diameter at second end 106. A central valve body cavity 110 extends through the entire valve body 102 and is formed by an inside wall of valve body 102, extending through the valve body 102. An annular valve seat 116 is formed by the chamfered edge of a shoulder formed at the juncture of a larger inside diameter section 118 and a smaller inside diameter section 120 of central body cavity 110, the larger inside diameter section 118 being toward the first end 104 and the smaller section 120 being toward the second end 106. Valve 100 further comprises a poppet 122 which is somewhat similar to poppet 14 of valve 10 in that it generally comprises a body section 124 and a head section 126 which is a larger outside diameter than the body section 124 and at the junction of said body and head sections, a shoulder 128 is formed which is releasibly engageable with valve seat 116 to control flow through valve 100. Poppet body section 124 has a central, axially extending bore 130 which is similar to poppet bore 22 of valve 10 and extends from an open end 134 to a blind end 146 and receives an expansion member 132 formed by a slug of silicone rubber. To cause poppet 122 to act in a manner opposite to that of poppet 14, the open end of poppet bore 130 is at the outer end of poppet head section 126 on the side of poppet shoulder 128 and of valve seat 116 that is toward first end 104. The direction of the poppet bore 130 from open end 134 to blind end 146 is the same as the direction of the expansive thrust of expansion member 132 and is in the direction from poppet shoulder 128 to valve seat 116. At second end 106, the inner wall of valve body 102 is further reduced in diameter forming a reduced diameter section 114 and a shoulder 140 that faces toward valve seat 116 and away from second end 106. A shoulder 138 is formed in the poppet body section 124 by a reduction in the outside diameter thereof, forming a reduced diameter end 142 at the opposite end from the poppet head section 126. Shoulder 138 faces second end 106. A spring 136 is retained between opposing shoulders 138 and 140. Spring 136 is of appropriate size and spring force to balance the expansive force of expansion member 132 when compressed by poppet shoulder 138 while allowing the expansive force of the expansion member 132 to move poppet 122 toward valve seat 116 at the desired temperature. The reduced outside diameter poppet end 142 is sized to be slidingly received within reduced inside diameter section 114 of second end 106, poppet end 142 being radially supported and axially free within the reduced section 114. Poppet end 142 comprises a central port 144 and a plurality of radial openings 166 that provide fluid communication between port 144 and valve body cavity 110, thereby providing a flow passage for the fluid medium to flow into or out of the valve body cavity 110 through the center of poppet end 142. Valve body second end 106 further comprises radial outlet ports 148 also providing an additional flow path for fluid medium to enter or exit valve body cavity 110 at second end 106. Poppet head section 126 forms radially protruding guide ridges 162 which slidingly engage the inside wall of larger inside diameter body section 118 to support and guide poppet head section 126 while allowing flow past the inlet end of the poppet head section 126. A stop member 150 comprises a radially outer surface formed with male screw threads 160 corresponding to and engaging with female screw threads 112 formed at first end 104. A hexagonal socket 158 is formed in the outer end of stop member 150 to provide means for applying rotational torque to the stop member 150. A plurality of ports 156 are angularly displaced radial to socket 158 to provide means for a fluid medium to enter into and exit from valve 100 valve body cavity 110 at first end 104. Stop member 150 comprises a plug section 152 which extends axially inward and is sealingly received with in the open end 134 of the poppet bore 130. By means of plug section 152, stop member 150 prevents the axial movement of expansion member 132 away from valve seat 116. The other end of expansion member 132 is secured against movement relative to poppet 122 by the blind end 146 of poppet bore 130. Rubber o-ring 154 is received within an annular channel 164 surrounding plug section 152 to seal poppet bore 130 and protect the material of expansion member 132 from contact with the fluid medium. When the stop member 150 has been placed at the desired axial position, the placement of the stop member 150 may be secured against change by tack welding or similar means. The stop member 150 is normally advanced sufficiently to expose female screw threads 112 at first end 104 to allow the engagement of an extraction tool (not shown). A notch 168 is formed in the poppet head shoulder 128 to allow a trickle flow through valve 100 even when closed in the same manner and with the same benefits as described above regarding valve 10.

It should be appreciated and anticipated that while expansion members 24 and 132 are formed of silicone rubber in the preferred embodiments described herein, a variety of materials could be chosen for the characteristic of having a high coefficient of thermal expansion relative to the other materials used, specifically, the material of the valve bodies 12 and 102 and the stop members 54 and 150. The substitution of such other substances could have satisfactory, but different results, depending upon the differences in rates of thermal expansion. The differing characteristics of such materials may require or allow variation of relevant design features without departing from the invention, particularly involving the selection of springs 36 and 136. The use of "O" rings to prevent contact between the silicone rubber and the fluid medium is required by the tendency of silicone rubber to swell when in contact with some fluids and substitution of other material may remove the necessity of the seal.

Although the flow through valves 10 and 100 may be bidirectional, the retentive force of the valve body 12 or 102 within the installation bore is not equal in either direction due to the tapering of the outer surface of the body. Accordingly, it is to be anticipated that in some circumstances it would be preferable to install either valve 10 or 100 with the larger diameter end toward the side of highest expected fluid pressure. In addition, it is also possible to reverse the direction of the taper; although to do so requires that the female extraction screw threads would have to be moved to the larger end to be effective. Further, although not described above, it is anticipated that the force of spring 36 could also be adjusted by means of the threaded retaining member 34. Adjustment of the spring force could allow a balancing of the force of thermal expansion of the expansion member 24 in accordance with the specific performance requirements that may be desired in a particular application.

It will further be anticipated that means of securing the valves 10 and 100 other than by tapering the outer surface, as described above, may be used without diminishing the essential benefits of the present invention. Such other means may include use of expansion or screw type devices to lock the valve within the flow passageway while providing a seal arround the valve. Additional means for sealing the junction of the valve with the flow passgaeway might include use of "O" rings or other gaskets.

What is claimed is:

1. A thermally responsive control valve comprising:
  A. a body having at least two ports and a central flow passage therebetween,
  B. a valve seat surrounding said flow passage,
  C. a poppet having a head which is moveable within the flow passage, toward and away from said valve seat to control flow through the flow passage, and
  D. means for changing the position of the poppet head relative to the valve seat in response to changes in temperature of fluid flowing through the valve comprising an expansion member having a first end, the axial position of which relative to the valve seat is adjustably secured by a stop member, and further having a second end the axial position of Which is fixed relative to the poppet head, and
  E. a spring secured within the valve body between the poppet and a spring retention means for adjustably compressing the spring to exert a force upon the popper in the direction of the stop member.

2. The valve of claim 1 wherein the expansion member is formed of a material having a higher coefficient of thermal expansion than the material of which the valve body is formed.

3. The valve of claim 1 further comprising means for securing the second end of the expansion member which comprises central bore formed within the poppet, the poppet bore having an open end and a closed end, and the expansion member is received within the poppet bore.

4. The valve of claim 1 wherein the stop member is slidingly received within the poppet bore at the open end thereof.

5. The valve of claim 4 wherein the poppet head comprises means for preventing the complete sealing of the flow passage through the valve by the engagement of the valve seat by the poppet head section.

6. The valve of claim 5 wherein the means for preventing complete sealing comprises a notch formed in the surface of the poppet head opposite the valve seat.

7. The valve of claim 6 wherein the expansion member is formed of an elastomeric substance.

8. The valve of claim 7 wherein the valve body comprises an outer surface comprising means for securely retaining the valve within a flow passageway.

9. The valve of claim 8 wherein the outer surface of the valve body is tapered, having a larger diameter end and a smaller diameter end.

10. The valve of claim 9 wherein thermal expansion of the expansion member causes the poppet head to move away from the valve seat and increase flow through the valve.

11. The valve of claim 9 wherein the expansion of the expansion member causes the poppet head section to move toward the valve seat and decrease flow through the valve.

12. The valve of claim 5 wherein thermal expansion of the expansion member causes the poppet head to move away from the valve seat and increase flow through the valve.

13. The valve of claim 12 wherein the means for preventing complete sealing comprises a notch formed in the surface of the poppet head opposite the valve seat.

14. The valve of claim 13 wherein the expansion member is formed of an elastomeric substance.

15. The valve of claim 14 wherein the valve body comprises an outer surface comprising means for securely retaining the valve within a flow passageway.

16. The valve of claim 15 wherein the outer surface of the valve body is tapered, having a larger diameter end and a smaller diameter end.

17. The valve of claim 5 wherein thermal expansion of the expansion member causes the poppet head to move toward the valve seat and decrease flow through the valve.

18. The valve of claim 17 wherein the means for preventing complete sealing comprises a notch formed in the surface of the poppet head opposite the valve seat.

19. The valve of claim 18 wherein the expansion member is formed of an elastomeric substance.

20. The valve of claim 19 wherein the valve body comprises an outer surface comprising means for securely retaining the valve within a flow passageway.

21. The valve of claim 20 wherein the outer surface of the valve body is tapered, having a larger diameter end and a smaller diameter end.

* * * * *